US010608838B2

(12) United States Patent
Sakata

(10) Patent No.: US 10,608,838 B2
(45) Date of Patent: Mar. 31, 2020

(54) INFORMATION PROVISION APPARATUS, SERVER APPARATUS, INFORMATION PROVISION METHOD, AND INFORMATION PROVISION PROGRAM

(71) Applicant: Panasonic Intellectual Property Corporation of America, Torrance, CA (US)

(72) Inventor: Kotaro Sakata, Tokyo (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 0 days.

(21) Appl. No.: 16/176,107

(22) Filed: Oct. 31, 2018

(65) Prior Publication Data
US 2019/0068395 A1 Feb. 28, 2019

Related U.S. Application Data

(63) Continuation of application No. 14/908,413, filed as application No. PCT/JP2014/003509 on Jul. 1, 2014, now Pat. No. 10,158,499.

(30) Foreign Application Priority Data

Aug. 29, 2013 (JP) ................................ 2013-177694

(51) Int. Cl.
*H04L 12/28* (2006.01)
*G06Q 10/00* (2012.01)
(Continued)

(52) U.S. Cl.
CPC .......... *H04L 12/2823* (2013.01); *G05B 15/02* (2013.01); *G05B 19/0428* (2013.01);
(Continued)

(58) Field of Classification Search
CPC . H04L 12/2823; H04L 12/4625; G06Q 10/20; G05B 2219/2642; G05B 23/2016; G05B 19/0428; G05B 15/02
See application file for complete search history.

(56) References Cited

U.S. PATENT DOCUMENTS 6,772,096 B2 8/2004 Murakami et al.
8,930,396 B2 1/2015 Tsao et al.
(Continued)

FOREIGN PATENT DOCUMENTS

JP 2003-43095 2/2003
JP 2003-84824 3/2003
(Continued)

OTHER PUBLICATIONS

International Search Report dated Sep. 9, 2014 in International Application No. PCT/JP2014/003509.

*Primary Examiner* — Vanthu T Nguyen
(74) *Attorney, Agent, or Firm* — Wenderoth, Lind & Ponack, L.L.P.

(57) ABSTRACT

An information provision apparatus whereby information regarding a malfunction or problem that occurred during the use of a prescribed model of home appliance can be shared with users using the same model of home appliance. A device (20) has the following: a presentation-information reception unit (21) that receives presentation information generated by a server (10) and stores the presentation information in a prescribed storage unit; and a presentation unit (22) that presents the presentation information to the user of the device (20), the presentation information having been read out from the aforementioned storage unit. The presentation information indicates malfunctions or problems that occurred in devices that are the same model as the abovementioned device (20) and were being used by other users.

7 Claims, 16 Drawing Sheets

(51) Int. Cl.
*H04L 12/46* (2006.01)
*G05B 15/02* (2006.01)
*G05B 19/042* (2006.01)
*G05B 23/02* (2006.01)

(52) U.S. Cl.
CPC ......... *G06Q 10/20* (2013.01); *H04L 12/4625* (2013.01); *G05B 23/0216* (2013.01); *G05B 2219/2642* (2013.01); *G05B 2219/34477* (2013.01)

(56) References Cited

U.S. PATENT DOCUMENTS

| | | |
|---|---|---|
| 8,981,930 B2 | 3/2015 | Horstemeyer et al. |
| 9,297,841 B2 | 3/2016 | Chun et al. |
| 2008/0126870 A1 | 5/2008 | Odani |

FOREIGN PATENT DOCUMENTS

| | | |
|---|---|---|
| JP | 2005-16871 | 1/2005 |
| JP | 2006-145053 | 6/2006 |
| JP | 2008-15568 | 1/2008 |
| JP | 2008-90682 | 4/2008 |
| JP | 2009-134527 | 6/2009 |
| JP | 2010-15246 | 1/2010 |
| JP | 2011-39160 | 2/2011 |
| WO | 03/023540 | 3/2003 |

| USER ID | MODEL ID | MALFUNCTION/PROBLEM STATE | DETECTED CONTENTS | OPERATING TIME |
|---|---|---|---|---|
| 130332A01 | A73214E | ABNORMAL NOISE DURING ROTATION OF LAUNDRY SINK | OVERWEIGHT | 1500 HOURS |
| 130332A02 | A73214E | NO MALFUNCTION/PROBLEM | OVERWEIGHT | 500 HOURS |
| 130332A03 | A73214E | LAUNDRY SINK DOES NOT ROTATE | MOTOR STOPPED | 1100 HOURS |
| ... | ... | ... | ... | ... |
| 130332A99 | A73214E | WATER LEAKAGE AFTER SPIN-DRYING | WATER LEAKAGE | 400 HOURS |

Columns: 301 USER ID, 302 MODEL ID, 303 MALFUNCTION/PROBLEM STATE, 304 DETECTED CONTENTS, 305 OPERATING TIME

FIG. 9

| 701 | 702 |
| --- | --- |
| DATE AND TIME | DETECTED CONTENTS |
| 2013/8/9/17:25 | TURBIDITY OF WATER IN LAUNDRY SINK |
| 2013/8/12/8:10 | OVERWEIGHT |
| ... | ... |
| 2013/8/24/22:35 | PAUSE OF ROTATION OF LAUNDRY SINK |

FIG. 10

LAUNDRY SINK IS OFTEN FULL OF CLOTHES AND
MALFUNCTIONS MAY START TO OCCUR
EARLIER THAN USUAL.
MALFUNCTION PROBABILITY WITHIN HALF YEAR IS 40%.
GIVE MORE ROOM IN LAUNDRY SINK AND PUT CLOTHES,
AND YOUR WASHING MACHINE WILL LAST LONGER.

FIG. 11A

SINCE YOU HANDLE YOUR WASHING MACHINE VERY CAREFULLY,
IT SEEMS TO LAST LONGER THAN USUAL.
THANK YOU FOR YOUR CAREFUL USE ALL THE TIME.

UNDER NORMAL CIRCUMSTANCES,
DEVICE PROBLEM RATE INCREASES IN TWO YEARS OR SO,
BUT YOUR WAY OF USE WILL HELP IT OPERATE FULLY FOR MORE THAN THREE YEARS.

FIG. 11B

INFORMATION PROVISION APPARATUS, SERVER APPARATUS, INFORMATION PROVISION METHOD, AND INFORMATION PROVISION PROGRAM

TECHNICAL FIELD

The present invention relates to an information providing apparatus, a server apparatus and an information providing method for providing a user with information relating to home appliances.

BACKGROUND ART

Systems have been proposed which predict maintenance and a remaining life until the service life of a household electrical appliance (hereinafter referred to as "home appliance") comes to an end, from operation data when the appliance is used, notify a user of the home appliance of maintenance timing and the predicted remaining life as time information useful in daily life, and can thereby lead to preventive maintenance when managing the appliance.

One such example is a refrigerator that measures an operating time of a water purification filter of a water supply tank and notifies the user of replacement of the water purification filter when the operating time exceeds a predetermined value (e.g., see Patent Literature (hereinafter referred to as "PTL") 1).

Another example is an air-conditioner that measures an operating time of a filter and notifies the user of replacement of the filter when the operating time exceeds a predetermined value (e.g., see PTL 2).

CITATION LIST

Patent Literature

PTL 1
Japanese Patent Application Laid-Open No. 2005-16871
PTL 2
Japanese Patent Application Laid-Open No. 2006-145053

SUMMARY OF INVENTION

Technical Problem

The home appliances in PTLs 1 and 2 can notify the user of timing of replacement of consumables of home appliances actually used by the user, but cannot notify the user of information relating to malfunctions or problems that have occurred in home appliances of the same model as the one actually used by the user but used by other users. Thus, with the appliances according to the related art, it is not possible to share information relating to malfunctions or problems that occur while the appliances are used, among users of home appliances of the same model.

An object of the present invention is to provide an information providing apparatus, a server apparatus and an information providing method capable of sharing, among users, information relating to malfunctions or problems that have occurred in devices of a predetermined model.

Solution to Problem

An information providing apparatus according to an aspect of the present invention includes: a presentation information receiving section that receives presentation information generated by a server apparatus and stores the presentation information in a predetermined storage section; and a presentation section that presents the presentation information read from the storage section to a user of a predetermined device, in which the presentation information is information indicating a malfunction or problem that has occurred in a model identical to that of the device used by another user.

A server apparatus according to an aspect of the present invention includes: a malfunction/problem information collection section that collects malfunction/problem information indicating malfunctions or problems that have occurred in devices used by a plurality of users, respectively, and stores the malfunction/problem information in a predetermined storage section; a presentation information generation section that generates presentation information indicating malfunctions or problems that have occurred in the devices based on the malfunction/problem information read from the storage section; and a presentation information transmitting section that transmits the presentation information to an apparatus used by a user using a model identical to that of the device.

An information providing method according to an aspect of the present invention is a method to be performed in a server apparatus disposed on a network, the method including: collecting malfunction/problem information indicating malfunctions or problems that have occurred in devices used by a plurality of users, respectively, and storing the malfunction/problem information in a predetermined storage section; generating presentation information indicating the malfunctions or problems that have occurred in the devices based on the malfunction/problem information read from the storage section; and transmitting the presentation information to an apparatus used by a user using the model identical to that of the device.

An information providing program according to an aspect of the present invention is a program to be executed by a computer disposed on a network, the program causing the computer to execute processing including: collecting malfunction/problem information indicating malfunctions or problems that have occurred in devices used by a plurality of users, respectively, and storing the malfunction/problem information in a predetermined storage section; generating presentation information indicating the malfunctions or problems that have occurred in the devices based on the malfunction/problem information read from the storage section; and transmitting the presentation information to an apparatus used by a user using the model identical to that of the device.

Advantageous Effects of Invention

According to the present invention, it is possible to share, among users, information relating to malfunctions or problems that have occurred in devices of a predetermined model.

BRIEF DESCRIPTION OF DRAWINGS

FIG. 9 is a diagram illustrating a collection example of malfunction/problem information according to Embodiment 2 of the present invention;

FIG. 10 is a diagram illustrating a collection example of usage log according to Embodiment 2 of the present invention;

FIGS. 11A and 11B are diagrams illustrating presentation examples of information provided by the information providing system according to Embodiment 2 of the present invention;

DESCRIPTION OF EMBODIMENTS

Hereinafter, embodiments of the present invention will be described with reference to the accompanying drawings.

(Overall Picture of Service Provided)

Figure 1A:
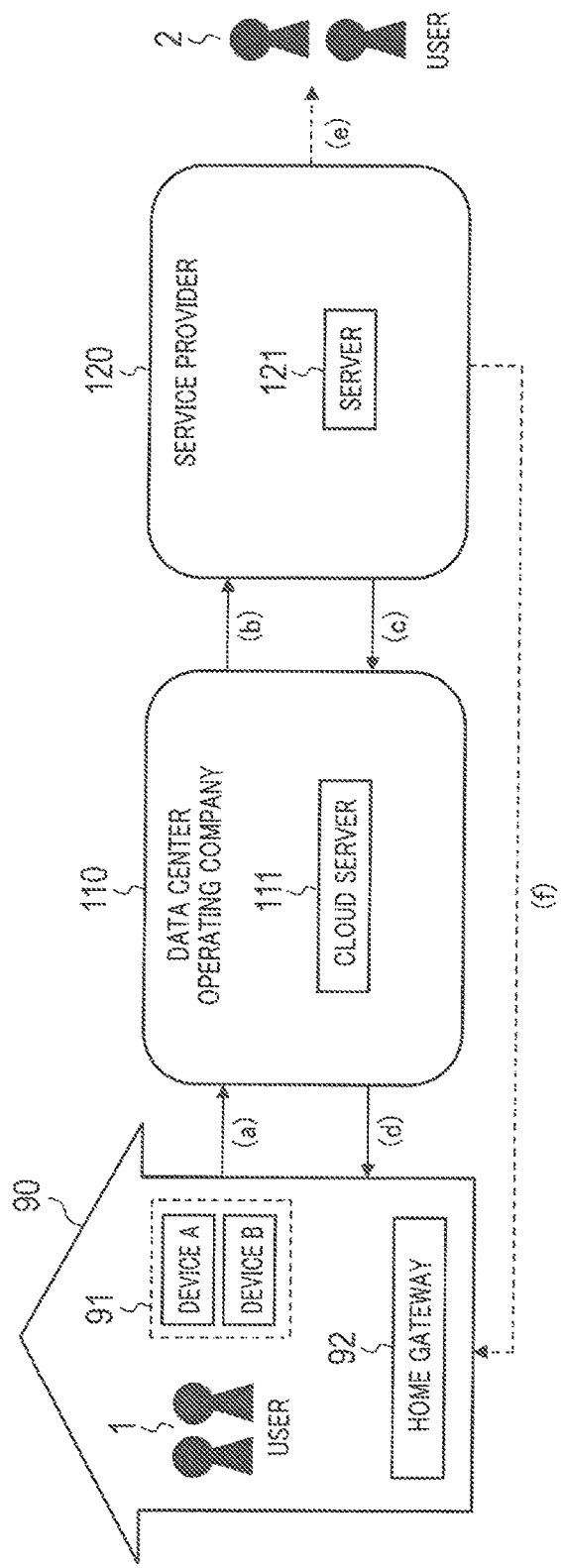
FIGS. 1A to 1C are diagrams illustrating an example of an overall picture of an information providing system according to Embodiments 1 and 2 of the present invention.

FIG. 1A illustrates an overall image of an information providing system according to the present embodiment.

Group 90 is, for example, a company, organization or home, whatever the size is. In group 90, there are a plurality of devices 91: device A and device B, and home gateway 92. The plurality of devices 91 include devices connectable to the Internet (e.g., smartphone, PC, TV) and devices not connectable to the Internet on their own (e.g., illumination, washing machine, and refrigerator). Among the devices not connectable to the Internet on their own, there may be devices that become connectable to the Internet via home gateway 92. In group 90, there is/are user/users 1 who uses/use the plurality of devices 91.

Data center operating company 110 includes cloud server 111. Cloud server 111 refers to a virtualization server that operates in coordination with various devices via the Internet. Cloud server 111 mainly manages huge data (big data) or the like that is hard to handle using a normal database management tool or the like. Data center operating company 110 performs data management, management of cloud server 111 or operation of the data center that performs such management, and so on.

Figure 1C:
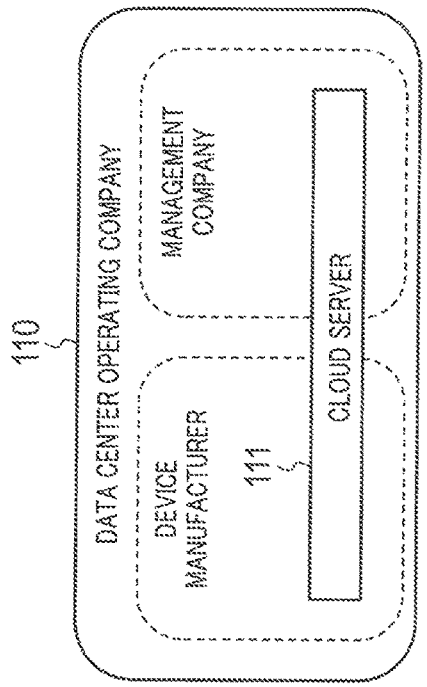
Figure 1B:
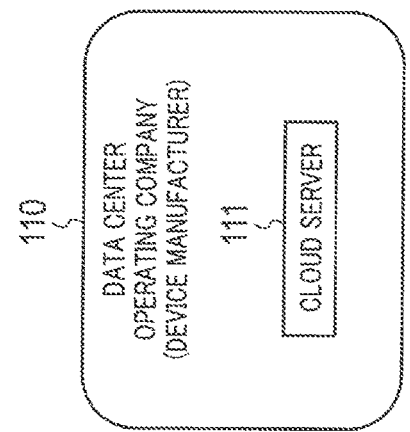

Details of services rendered by data center operating company 110 will be described later. Here, data center operating company 110 is not limited to only companies that perform data management or operation of cloud server 111. For example, when a device maker that develops or manufactures one of the plurality of devices 91 also performs data management or management of cloud server 111, the device maker corresponds to data center operating company 110 (FIG. 1B). Data center operating company 110 is not limited to one company. For example, when a device maker and another management company are jointly performing or taking partial charge of data management or operation of cloud server 111, both or one of the two correspond(s) to data center operating company 110 (FIG. 1C).

Service provider 120 owns server 121. Server 121 referred to here includes, for example, a memory in a personal PC, whatever the scale is. Moreover, there is also a case where the service provider does not own server 121.

Note that home gateway 92 is not mandatory in the above-described service. For example, when cloud server 111 is performing whole data management, home gateway 92 is unnecessary. There can be a case where device not connectable to the Internet on its own does not exist as in the case where all devices in a home are connected to the Internet.

Next, an information flow in the above-described service will be described.

First, device A or device B of group 90 transmits each piece of log information to cloud server 111 of data center operating company 110. Cloud server 111 accumulates log information of device A or device B ((a) in FIG. 1A). Here, the log information is information indicating, for example, an operation situation, operation date and time of the plurality of devices 91. Examples of the log information include a TV viewing history, video recording reservation information of a recorder, operation date and time of a washing machine, the amount of laundry, date and time of opening/closing of a refrigerator, the number of times the refrigerator is opened/closed, however the log information is not limited to these examples and the log information refers to all information obtainable from all kinds of devices. The log information may be provided from the plurality of devices 91 themselves to cloud server 111 directly via the Internet. The log information may be accumulated from the plurality of devices 91 in home gateway 92 temporarily and then provided from home gateway 92 to cloud server 111.

Next, cloud server 111 of data center operating company 110 provides the accumulated log information to service provider 120 in a fixed unit. Here, the unit may be one that allows information accumulated by the data center operating company to be organized and provided to service provider 120 or may be one requested by service provider 120. Although the unit has been described as a "fixed unit," the unit may not be fixed but the amount of information provided may vary depending on the situation. The log information is stored in server 121 owned by service provider 120 as required ((b) in FIG. 1A). Service provider 120 organizes the log information into information suitable for a service to be provided to the user and provides the log information to the user. The user who provides the log information may be user 1 who uses the plurality of devices 91 or external user 2. As for a method of providing a service to the user, the service may be provided, for example, directly to the user from the service provider ((e) and (f) in FIG. 1A). As another method of providing a service to the user, the service may be provided to the user, for example, via cloud server 111 of data center operating company 110 again ((c) and (d) in FIG. 1A). Moreover, cloud server 111 of data center operating company 110 may organize log information into information suitable for a service to be provided to the user and then provide the log information to service provider 120.

Note that user 1 may be different from or identical to user 2.

Embodiment 1

Embodiment 1 will be described.

Figure 2:
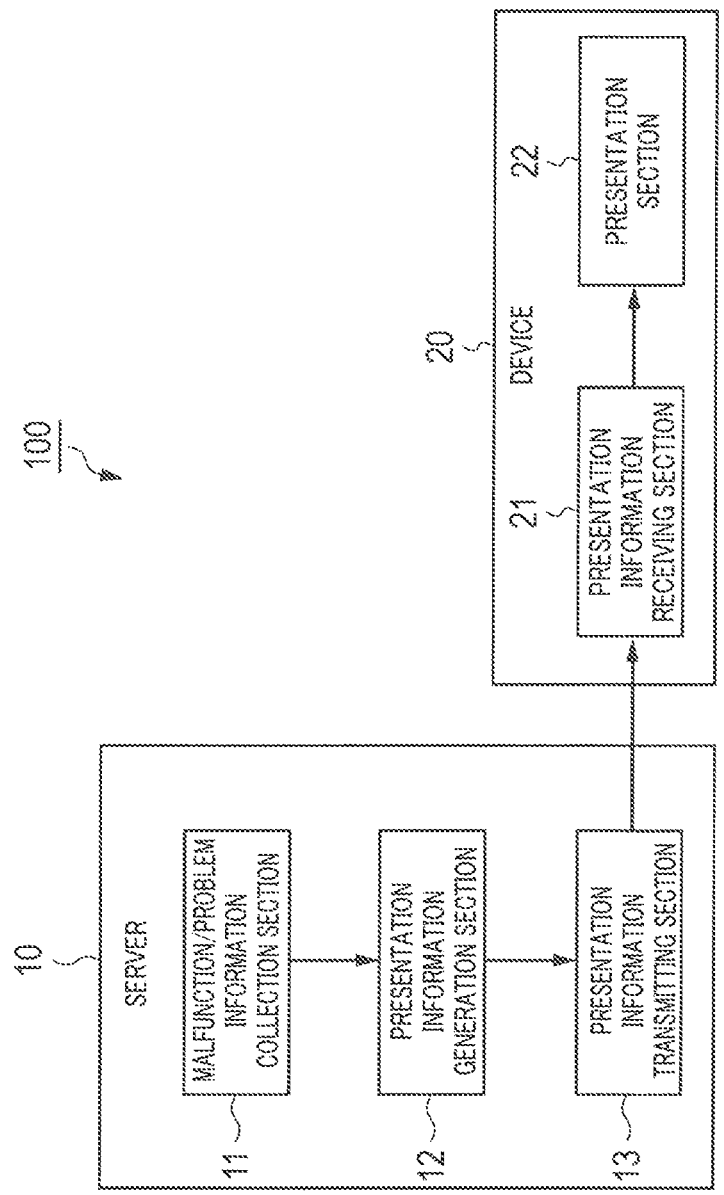
FIG. 2 is a block diagram illustrating a configuration example of the information providing system according to Embodiment 1 of the present invention.

A configuration example of information providing system 100 according to the present embodiment will be described using FIG. 2 first. FIG. 2 is a block diagram illustrating the configuration example of information providing system 100.

In FIG. 2, information providing system 100 of the present embodiment includes server 10 (an example of the server apparatus of the present invention), device 20 (an example of the information providing apparatus of the present invention). Server 10 and device 20 are connected via a wired network, a wireless network or a network in which wired and wireless networks are mixed. Note that although only one device 20 is illustrated in FIG. 2, suppose a plurality of devices 20 exist. Suppose that the plurality of devices 20 are of the same model.

Suppose device 20 is an appliance such as a television, cleaner, air cleaner, washing machine, refrigerator, microwave oven, air-conditioner, electric tooth brush, dryer. Alternatively, device 20 may be an information terminal such as personal computer, mobile phone, smartphone, tablet or a sensor such as blood glucose level sensor or an instrument such as toilet, bathroom, mirror, illumination.

Furthermore, suppose that server 10 is a server operated and/or managed by a manufacturer or distributor of device 20 or agent entrusted by the manufacturer or distributor, for example.

Server 10 includes malfunction/problem information collection section 11, presentation information generation section 12, and presentation information transmitting section 13.

Figure 12:
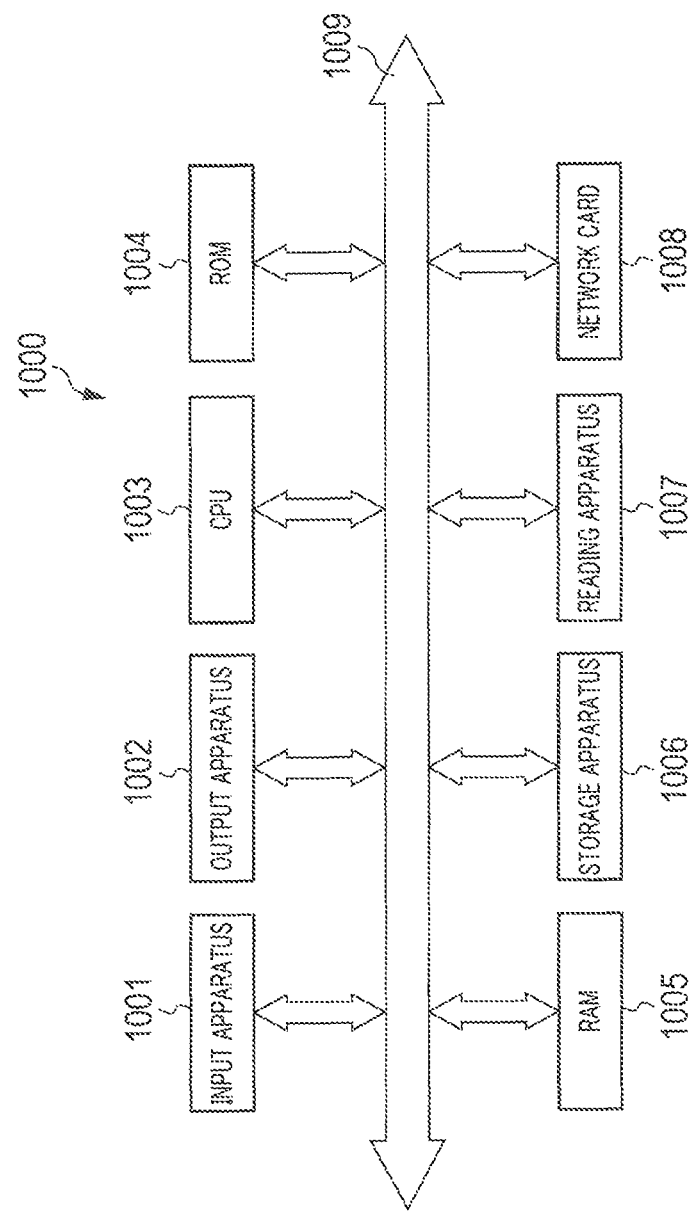
FIG. 12 is a diagram illustrating a hardware configuration example of a server and a device according to Embodiments 1 and 2 of the present invention.

Malfunction/problem information collection section 11 collects malfunction/problem information and stores the information in a storage section (not shown) (e.g., corresponding to RAM 1005 or storage apparatus 1006 in FIG. 12). The malfunction/problem information refers to information indicating malfunctions or problems generated in the plurality of devices 20 respectively. The malfunction/problem information is data reported at any time from each user using device 20 and a collection of such data is data called "big data," for example. Specific examples of the malfunction/problem information will be described later using FIG. 4.

Presentation information generation section 12 reads the malfunction/problem information collected by malfunction/problem information collection section 11 from the storage section and generates presentation information based on action information thereof. The presentation information is information indicating a malfunction or problem that has occurred in each device 20. Specific examples of generation of the presentation information will be described later.

Presentation information transmitting section 13 transmits the presentation information generated by presentation information generation section 12 to each device 20.

Device 20 includes presentation information receiving section 21 and presentation section 22.

Presentation information receiving section 21 receives the presentation information transmitted from presentation information transmitting section 13 of server 10. The received presentation information is stored in the storage section (not shown) (e.g., corresponding to RAM 1005 or storage apparatus 1006 in FIG. 12).

Presentation section 22 reads the presentation information received by presentation information receiving section 21 from the storage section and presents the presentation information to the user of device 20 using a predetermined method. A presentation example is a method that displays an image of the presentation information on a display provided on device 20. This image display may be accompanied by sound (e.g., effect sound, guide speech) output. A specific example of presentation of the presentation information will be described later using FIG. 5.

Note that although not shown in FIG. 2, device 20 includes a malfunction/problem information generation section that generates malfunction/problem information indicating a malfunction or problem that has occurred in device 20 and a malfunction/problem information transmitting section that transmits the generated malfunction/problem information to server 10.

Figure 3:
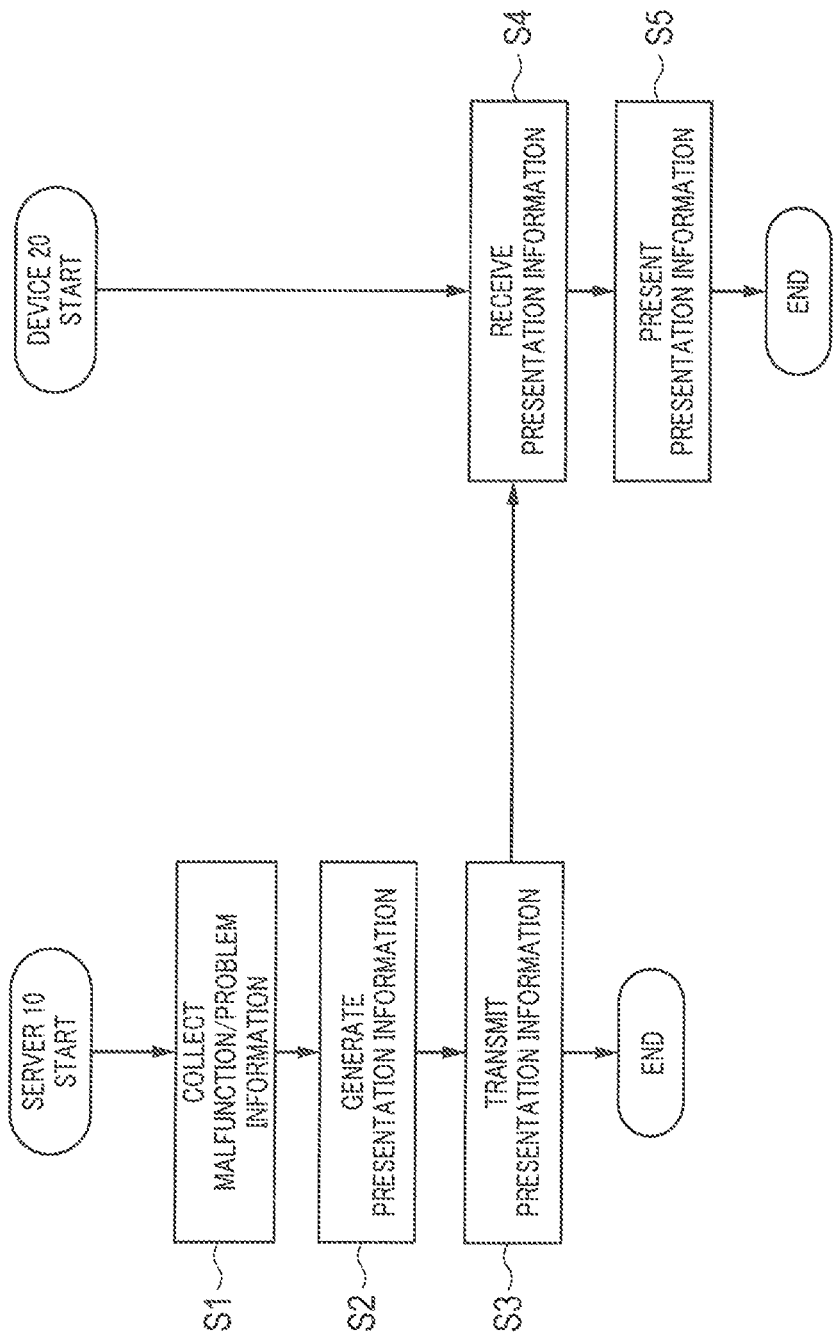
FIG. 3 is a sequence diagram illustrating an operation example of the information providing system according to Embodiment 1 of the present invention.

Next, an operation example of information providing system 100 according to the present embodiment will be described using FIG. 3. FIG. 3 is a sequence diagram illustrating an operation example of information providing system 100 of the present embodiment. Note that a washing machine will be described below as an example of device 20.

In step S1, malfunction/problem information collection section 11 of server 10 collects malfunction/problem information from devices 20 used for a plurality of users respectively via, for example, the Internet.

Figure 4:
FIG. 4 is a diagram illustrating a collecting example of malfunction/problem information according to Embodiment 1 of the present invention.

Malfunction/problem information collection section 11 creates a data table that lists the malfunction/problem information collected from respective devices 20 and stores the data table in the storage section. An example of the data table is shown in FIG. 4. FIG. 4 is an example of listing of the collected malfunction/problem information.

In FIG. 4, the malfunction/problem information includes user ID 301, model ID 302 and malfunction/problem state 303. User ID 301 is identification information assigned to each user using a device of a predetermined model. Model ID 302 is identification information assigned to each model of a device used by each user. Malfunction/problem state 303 is information indicating the state of a malfunction or problem. In the example in FIG. 4, malfunction/problem state 303 indicates a malfunction or problem of a washing machine. Malfunction/problem information collection section 11 collects malfunction/problem information having same model ID 302 ("A73214E" in the example in FIG. 4), integrates them and creates the data table shown in FIG. 4.

In step S2, presentation information generation section 12 reads, for example, the data table shown in FIG. 4 from the storage section, extracts a predetermined state from malfunction/problem state 303 of the data table and generates presentation information including the state in the presentation contents. For example, presentation information generation section 12 calculates the total number by type of malfunction/problem state 303 and extracts a state in which the total number exceeds a predetermined threshold (value indicating a priority of presentation). For example, in the data table in FIG. 4, if the total number of "abnormal noise during rotation of the laundry sink" exceeds a threshold, presentation information generation section 12 extracts "abnormal noise during rotation of the laundry sink" as a state to be presented to the user. Presentation information generation section 12 then generates a message that presents the extracted state and generates image data including the message (an example of presentation information, hereinafter referred to as "image data"). The message has contents such as "Many examples are reported of a case where abnormal noise occurs during rotation of the laundry sink in the same model as that of your washing machine. Does your machine have any abnormal noise?"

Note that the aforementioned presentation information may be generated for every predetermined period (e.g., 1 day, 1 week, 1 month or the like) or at a point in time at which the total number of some states registered in malfunction/problem state 303 exceeds a threshold.

In step S3, presentation information transmitting section 13 transmits presentation information (e.g., the above-described image data) to each device 20 via, for example, the Internet. Note that presentation information transmitting section 13 stores destination information accessible to each device 20 (e.g., IP address or the like) beforehand and transmits image data to each device 20 based on the destination information.

In step S4, presentation information receiving section 21 of device 20 receives presentation information (e.g., above-described image data) transmitted from presentation information transmitting section 13. The received image data is stored in the storage section and then read by presentation section 22 at predetermined timing.

Figure 5B:
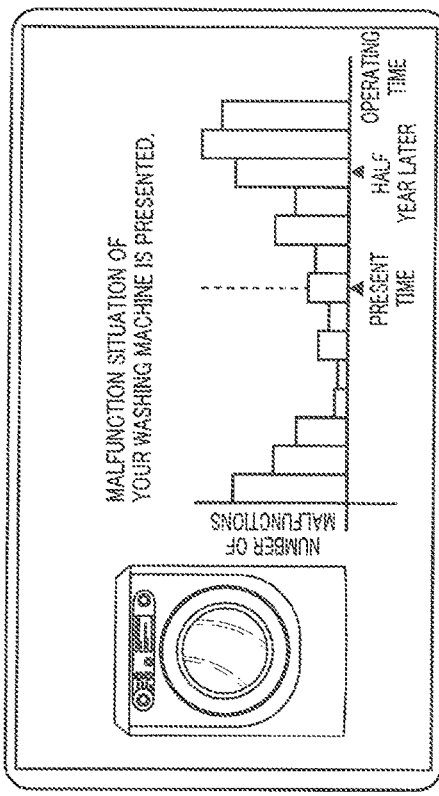
FIGS. 5A to 5D are diagrams illustrating an example of presentation of presentation information according to Embodiment 1 of the present invention.
Figure 5D:
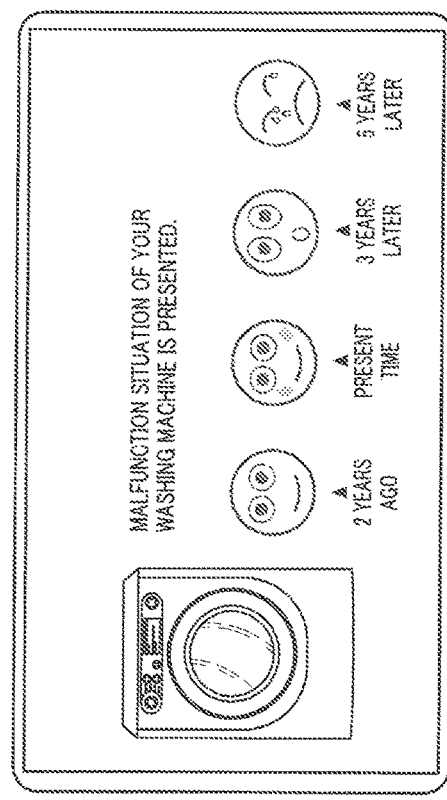
Figure 5A:
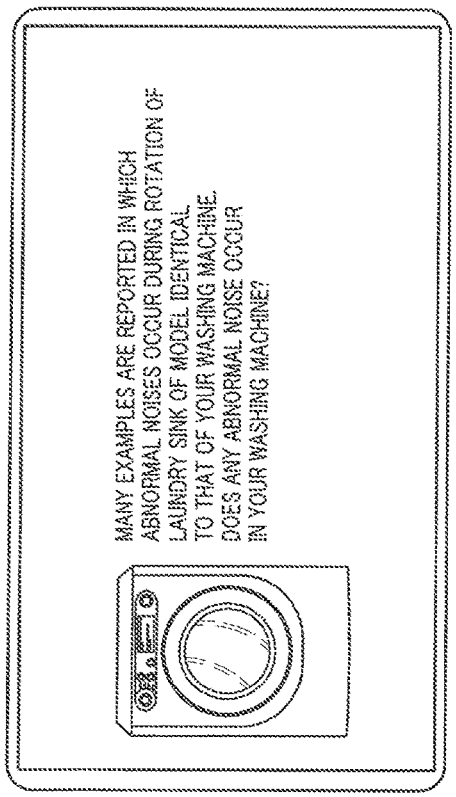

In step S5, presentation section 22 presents the presentation information to the user of device 20. For example, presentation section 22 displays the above-described image data on the display of device 20 as the presentation information. This display example is shown in FIG. 5A. As shown in FIG. 5A, device 20 displays an image including a message indicating that many abnormal noises occur during spin-drying in the plurality of devices 20.

As described above, the present embodiment has a feature of presenting information (conventionally, information not provided for the users) relating to malfunctions or problems that have occurred in devices respectively used by a plurality of users to users using the same model as that of the device. Therefore, information relating to a malfunction or problem that has occurred in a device of a predetermined model can be shared among users using the same model as that of the device.

Note that the following modifications are possible in present Embodiment 1.

For example, the presentation information is not only presented in home appliances relating to the presentation information, but also presented in other information processing apparatuses (e.g., personal computer, tablet, smartphone) that have nothing to do with the presentation information. Alternatively, the presentation information may be presented only in the above-described other information processing apparatuses.

For example, the malfunction/problem information may be collected not only from the same model but also from similar models. In that case, the presentation information is generated based on malfunction/problem information collected from devices of the same and similar models. Thus, in addition to malfunctions and problems that have occurred in the same model, the presentation information includes also malfunctions and problems that have occurred in similar models. Moreover, the presentation information may be transmitted not only to the same model but also to similar models. Alternatively, malfunction/problem information may be collected for or presentation information may be transmitted to only devices of similar models. Note that a similar model is a model similar to that of device 20, and is a model of the same brand, for example. A high-end model and a low-end model of the same brand have a relationship between similar models.

Furthermore, for example, when extracting a malfunction/problem state to be presented to the user, presentation information generation section 12 may calculate a score not only with the total number but also with the total number assigned a predetermined weight, and extract a malfunction/problem state depending on whether or not the score exceeds a threshold. In this way, it is possible to extract important malfunctions or problems although the number of reports from other users is not large.

Furthermore, for example, the presentation information displayed may include not only a message but also a graph or the like. FIG. 5B shows an example of presentation information including a message and a graph. In FIG. 5B, a bar graph is displayed which defines an operating time of the device on the horizontal axis and the number of malfunction cases on the vertical axis. In this case, the collected malfunction/problem information includes an "operating time (time that has elapsed after starting to use a device)" in addition to user ID 301 and model ID 302, malfunction/problem state 303 shown in FIG. 4. Upon collecting malfunction/problem information, presentation information generation section 12 counts and stores the total number of malfunction/problem states 303 per operating time (e.g., the number of malfunction occurrences in 1-month units). Furthermore, presentation information generation section 12 has a timer function and measures the time that has elapsed after starting to use device 20 (e.g., when power is initially turned on) as an operating time. Presentation information generation section 12 expresses in a bar graph, the number of malfunction cases counted by the point in time, for example, every one month. At this time, the operating times of device 20 may be displayed on the horizontal axis. Thus, the user can figure out within what time device 20 used by the user is likely to fail. Note that a probability that a malfunction may occur (hereinafter referred to as "malfunction rate") may also be calculated and displayed instead of the number of malfunction cases.

Figure 5C:
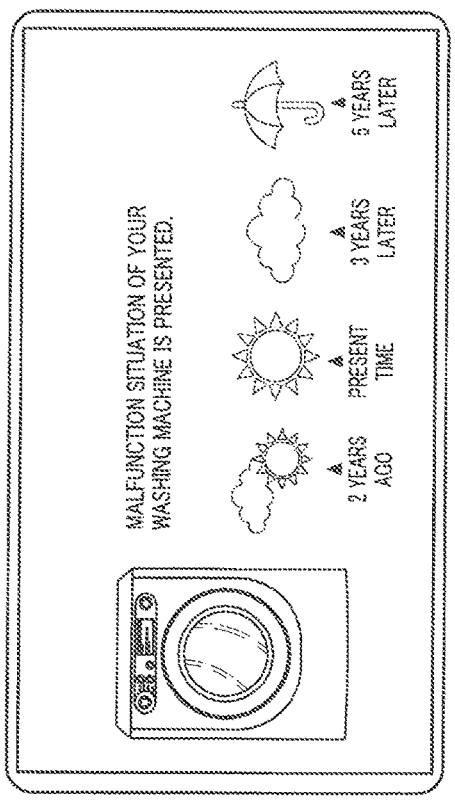

For example, the operating times and the number of malfunction occurrences (or malfunction rate) may be displayed using a predetermined image instead of the graph shown in FIG. 5B. Such specific examples are shown in FIG. 5C and FIG. 5D. FIG. 5C shows the number of malfunction occurrences using images schematically illustrating the weather per operating time. FIG. 5D shows the number of malfunction occurrences using images schematically illustrating human expressions per operating times. The four images shown in FIG. 5C and FIG. 5D represent cases where the number of malfunction occurrences is "somewhat small," "small," "somewhat large," "large" in order from the left. Such an image display allows the user to more easily figure out the relationship between the operating time and the number of malfunction occurrences.

Embodiment 2

Embodiment 2 will be described.

Figure 6:
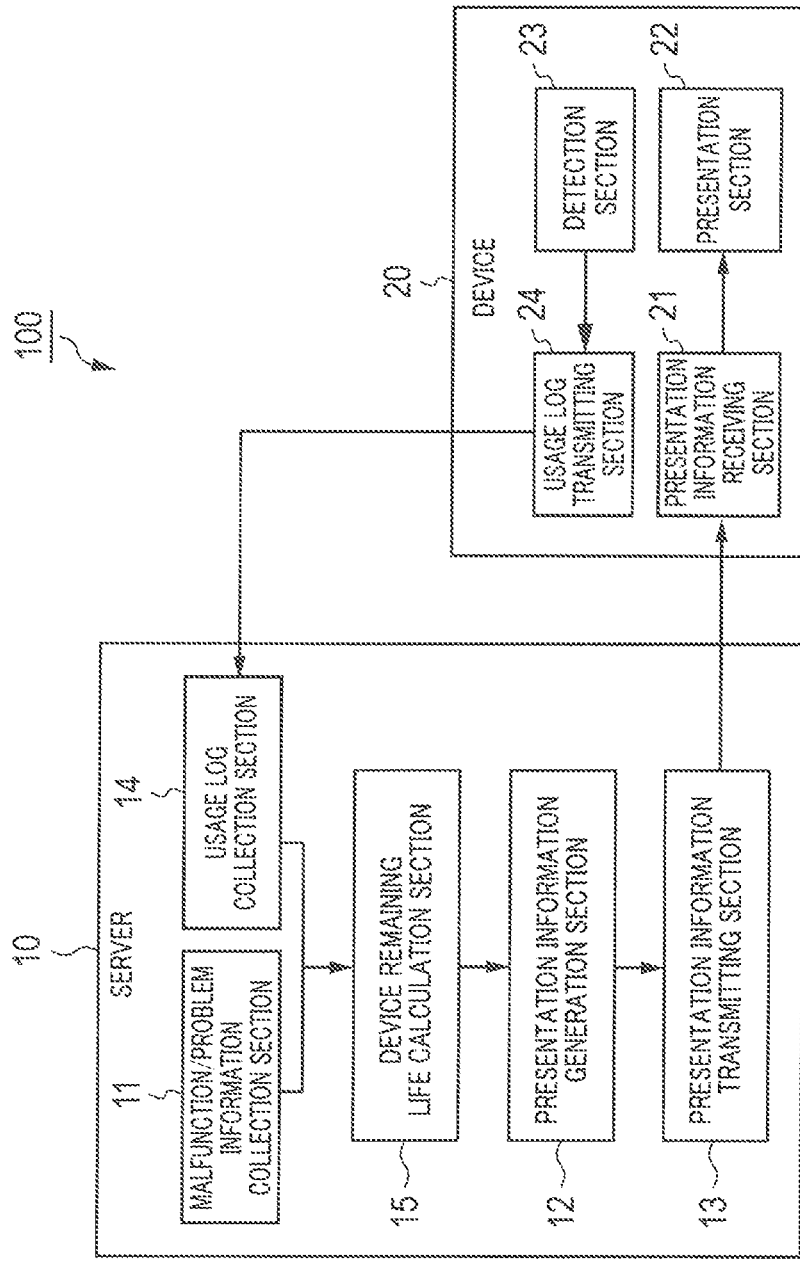
FIG. 6 is a block diagram illustrating a configuration example of an information providing system according to Embodiment 2 of the present invention.

First, a configuration example of information providing system 100 according to the present embodiment will be described using FIG. 6. FIG. 6 is a block diagram illustrating a configuration example of information providing system 100. In FIG. 6, components identical to those in FIG. 2 are assigned identical reference numerals and description thereof will be omitted.

Server 10 includes usage log collection section 14 and device remaining life calculation section 15 in addition to malfunction/problem information collection section 11, presentation information generation section 12 and presentation information transmitting section 13.

Malfunction/problem information collection section 11 collects malfunction/problem information and stores the information in a storage section as in the case of Embodiment 1. However, the malfunction/problem information collected in the present embodiment includes detected contents 304 and operating 305 in addition to 301 to 303 shown in FIG. 4. The malfunction/problem information will be described later using FIG. 9.

Usage log collection section 14 collects usage logs of device 20 and stores the usage logs in the storage section (not shown) (e.g., corresponding to RAM 1005 or storage apparatus 1006 in FIG. 12). Details of usage logs will be described later using FIG. 10.

Device remaining life calculation section 15 reads the malfunction/problem information collected by malfunction/problem information collection section 11 and the usage logs collected by usage log collection section 14 from the storage section. Device remaining life calculation section 15 newly creates or updates (hereinafter simply referred to as "generates") a malfunction rate curve based on the malfunction/problem information and the usage logs. After that, device remaining life calculation section 15 calculates a remaining life of device 20 or a malfunction rate within a predetermined period of device 20 based on the malfunction rate curve. Specific calculation examples of the remaining life and the malfunction rate will be described later.

Figure 7:
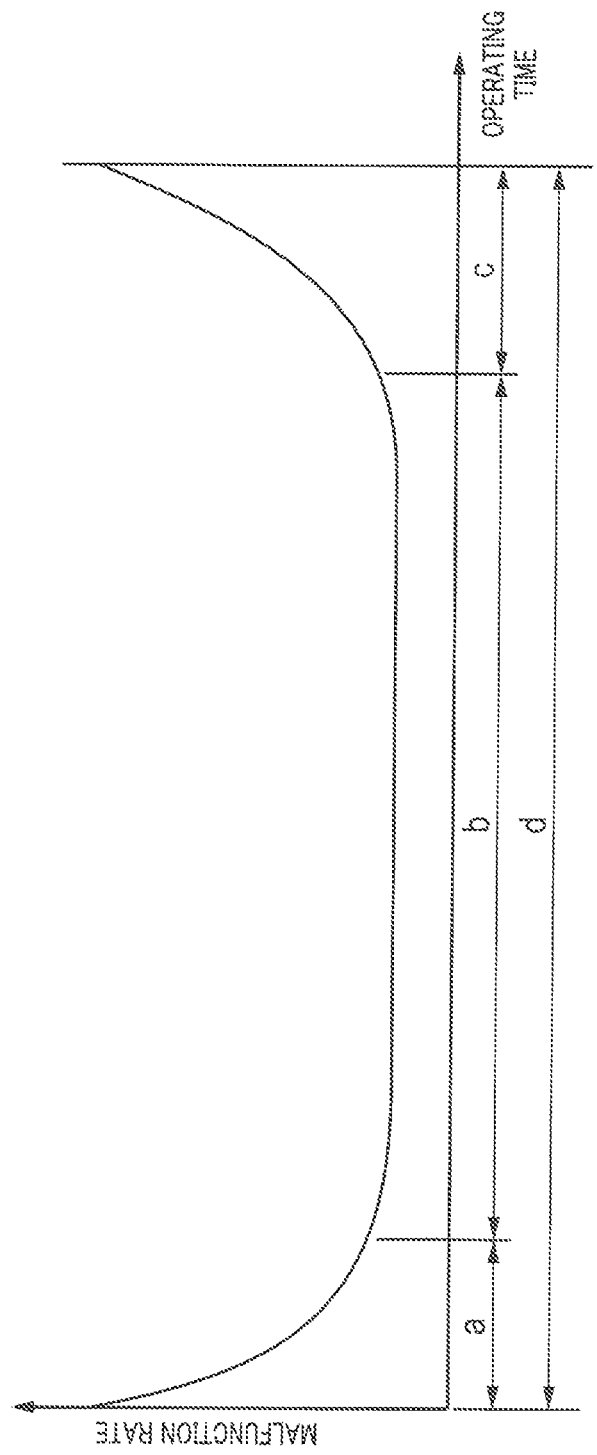
FIG. 7 is a diagram illustrating an example of a malfunction rate curve according to Embodiment 2 of the present invention.

Here, the malfunction rate curve generated by device remaining life calculation section 15 will be described. An example of this malfunction rate curve is shown in FIG. 7. FIG. 7 illustrates a malfunction rate curve calculated beforehand about device 20 and an identical model thereof. In FIG. 7, the vertical axis shows a malfunction rate and the horizontal axis shows an operating time. The malfunction rate curve has a shape like a cross section of a bath tub, and is therefore called a "bath tub curve." Period "a" is called an "initial malfunction period" and is a period during which a high malfunction rate drastically decreases. The start point of period "a" is an operation start time of device 20. During this period "a," initial malfunctions occur due to design defect, manufacturing defect, material defect or the like. Period "b" is called a "random malfunction period" and is a period during which a low malfunction rate is kept substantially constant. Period "c" is called a "wear-out malfunction period" and is a period during which a low malfunction rate drastically increases. An end point of this period "c" is a time at which the life of device 20 comes to an end. During this period "c," wear-out malfunctions occur due to wear-out, fatigue, deterioration or the like. Period "d" is a period from the start point of period "a" to the end point of period "c," and corresponds to the life (operation time) of device 20. Note that the malfunction rate curve shown in FIG. 7 is a default (when device 20 is used without occurrence of any malfunction or problem) malfunction rate curve.

Presentation information generation section 12 generates presentation information including the remaining life and/or malfunction rate calculated by device remaining life calculation section 15. Specific examples of generation and display of the presentation information will be described later.

Device 20 includes detection section 23 and usage log transmitting section 24 in addition to presentation information receiving section 21 and presentation section 22.

Detection section 23 is, for example, a sensor that detects a predetermined event (an event that can cause a malfunction or problem) when device 20 is used. When device 20 is a washing machine, device 20 is provided with, for example, a water quality sensor, weight sensor, button sensor as detection section 23. The water quality sensor is a sensor capable of detecting that turbidity of water in a laundry sink reaches or exceeds a threshold. On the other hand, the weight sensor is a sensor capable of detecting that the weight of articles placed in the laundry sink reaches or exceeds a threshold. The button sensor is a sensor capable of detecting that a button provided for device 20 (e.g., power supply button, pause button) has been operated during rotation of the laundry sink.

Usage log transmitting section 24 links detected contents detected by detection section 23 (e.g., turbidity of water, overweight) with the time of detection (year/month/day and time measured by the timer function of device 20) and generates a usage log. Usage log transmitting section 24 then transmits the usage log generated to server 10 through wireless communication or wired communication. Details of the usage log will be described later using FIG. 10.

Figure 8:
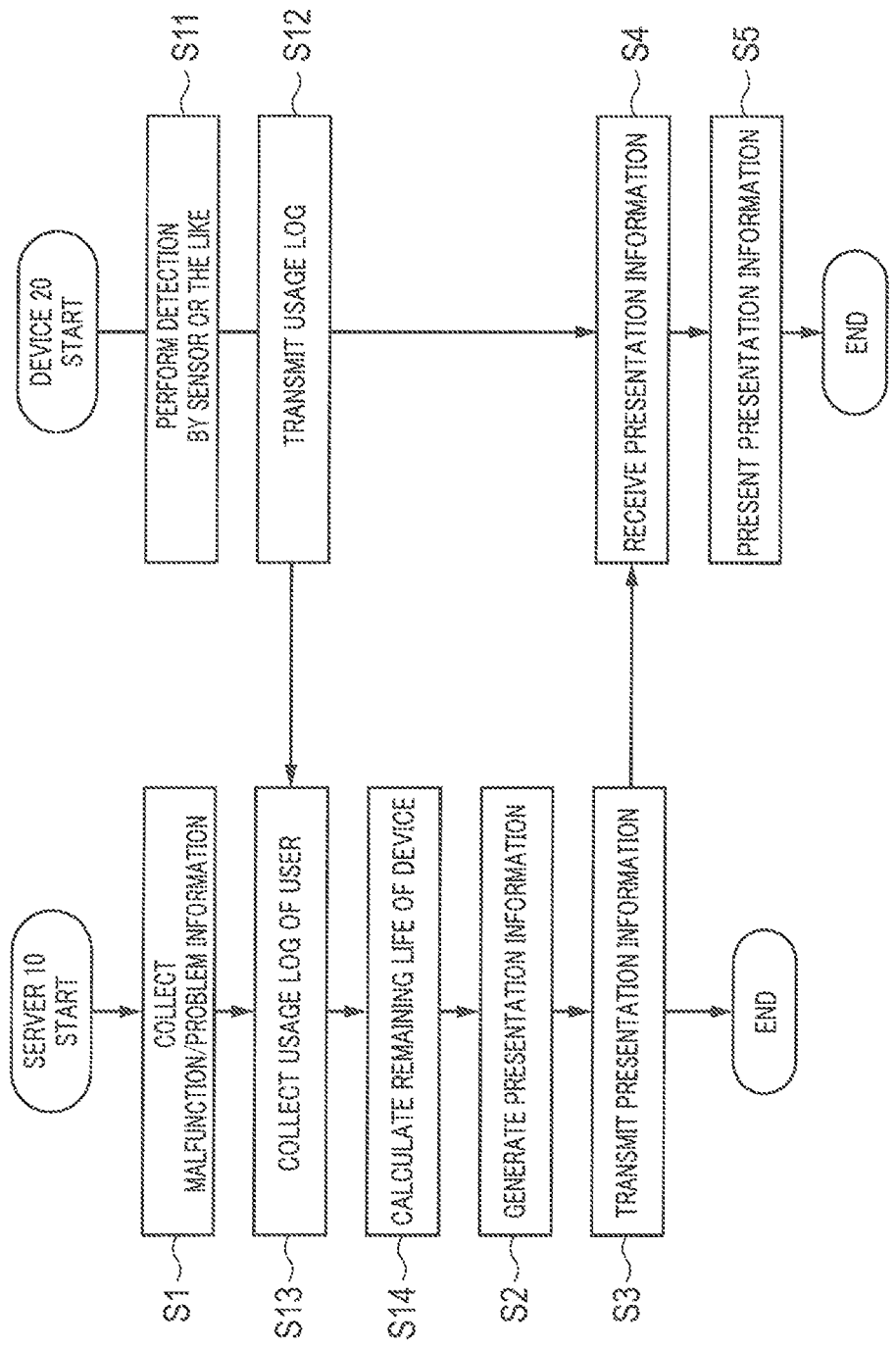
FIG. 8 is a sequence diagram illustrating an operation example of the information providing system according to Embodiment 2 of the present invention.

Next, an operation example of information providing system 100 according to the present embodiment will be described using FIG. 8. FIG. 8 is a sequence diagram illustrating an operation example of information providing system 100 of the present embodiment. Note that as an example of device 20, a washing machine will be described below. A case will be described below as an example where a usage log is collected from one of a plurality of devices 20 of the same model.

In step S1, malfunction/problem information collection section 11 of server 10 collects malfunction/problem information and stores the information in the storage section. However, as described above, the malfunction/problem information collected here includes detected contents 304 and operating 305 in addition to user ID 301, model ID 302 and malfunction/problem state 303 as shown in FIG. 9. Detected contents 304 refers to information indicating contents detected by the above-described sensor in device 20. Operating time 305 refers to a time that has elapsed after starting to use device 20 as described above.

In step S11, detection section 23 of device 20 performs various types of detection when device 20 is used. Examples of contents detected here include turbidity of water in the laundry sink, overweight in the laundry sink and rotation stopping operation during rotation of the laundry sink as described above.

In step S12, usage log transmitting section 24 links the contents detected by detection section 23 to the time of detection to generate a usage log (for a specific example, see FIG. 10 which will be described later), and transmits the usage log to server 10 via the Internet, for example.

In step S13, usage log collection section 14 collects a usage log from device 20 via, for example, the Internet. This usage log collection is done by receiving the usage log from device 20 via, for example, the Internet.

Usage log collection section 14 then creates a data table that lists usage logs collected from device 20 and stores the data table in the storage section. An example of this data table is shown in FIG. 10. FIG. 10 shows an example of listing of collected usage logs.

In FIG. 10, the usage log includes date and time 701 and detected contents 702. Date and time 701 is information indicating the time (year, month, day and time) of detection of detected contents 702 by device 20. Detected contents 702 are information indicating contents detected by device 20.

In step S14, device remaining life calculation section 15 generates a malfunction rate curve based on the malfunction/problem information collected by malfunction/problem information collection section 11 and the usage log collected by usage log collection section 14 and then calculates the remaining life of device 20 based on the malfunction rate curve. A specific example of this operation will be described below.

First, device remaining life calculation section 15 reads the data table of usage logs (e.g., data table in FIG. 10) from the storage section, calculates the total number per detected contents 702 from the data table and identifies detected contents 702 whose total number is equal to or greater than a threshold. Here, suppose that detected contents 702 of, for example, "overweight," is identified.

Next, device remaining life calculation section 15 reads a data table of malfunction/problem information (e.g., data table shown in FIG. 9) from the storage section and searches for same detected contents 304 as identified detected contents 702 in the data table. For example, when, for example, "overweight" is identified as detected contents 702, device remaining life calculation section 15 searches for detected contents 304 that corresponds to "overweight" in FIG. 9. Device remaining life calculation section 15 then calculates a malfunction rate and an operating (life "d") in the malfunction rate curve based on malfunction/problem state 303 and operating times 305 corresponding to detected contents 304 searched for.

First, a specific example of calculating a malfunction rate will be described. Device remaining life calculation section 15 calculates the total number of detected contents 304 searched for (hereinafter referred to as "the number of detected contents"). Device remaining life calculation section 15 calculates the total number of malfunction/problem states 303 corresponding to detected contents 304 searched for, which indicate malfunction/problem states (hereinafter referred to as "the number of malfunctions/problems") by operating time 305. For example, in FIG. 9, in a case where malfunction/problem state 303 indicates "abnormal noise during rotation of the laundry sink," device remaining life calculation section 15 regards it as a case indicating a malfunction/problem state and counts the case, whereas in a case where malfunction/problem state 303 indicates "no malfunction/problem," device remaining life calculation section 15 regards it as a case not indicating a malfunction/problem state and does not count the case. Device remaining life calculation section 15 calculates the number of malfunctions/problems/the number of detected malfunctions/problems for each operating time and thereby calculates a malfunction rate by operating time.

Next, a specific example of life "d" is calculated. Of malfunction/problem states 303 corresponding to searched detected contents 304, device remaining life calculation section 15 calculates an average of operating times 305 corresponding to malfunction/problem states 303 indicating malfunction/problem states. Device remaining life calculation section 15 then regards the calculated average value as life "d." The malfunction rate curve generated in this way has shorter life "d" than the malfunction rate curve shown in FIG. 7.

The malfunction rate curve generated as described above becomes a curve reflecting malfunction/problem information of a plurality of users using the same model as that of device 20. Note that the malfunction rate curve newly created through the above-described procedure is updated periodically or when a new usage log or malfunction/problem information is collected in the same way as the procedure when a new malfunction rate curve is created.

Next, device remaining life calculation section 15 measures a time that has elapsed after starting to use device 20 (e.g., when power is initially turned on) using a timer function as an operating time. Device remaining life calculation section 15 then calculates a difference between life "d" indicated by the malfunction rate curve and the operating time as a remaining life (period until the life of device 20 comes to an end).

Note that device remaining life calculation section 15 may also calculate a malfunction rate within a predetermined period of device 20 other than the remaining life of device 20 (see FIG. 11A). For example, device remaining life calculation section 15 calculates a malfunction rate within a predetermined period based on the measured operating time (start point) and a specified value (end point) indicating a predetermined period and a curve between the start point and the end point in the malfunction rate curve.

A specific example of the processing in step S14 has been described so far.

In step S2, presentation information generation section 12 generates presentation information as described in FIG. 3. However, suppose that the presentation information generated in the present embodiment includes the remaining life and/or malfunction rate calculated by device remaining life calculation section 15. For example, presentation information generation section 12 generates image data including the remaining life and/or malfunction rate in a fixed phrase message.

Since steps S3, S4 and S5 are the same as described in FIG. 3, a description herein will be omitted.

Examples of displayed presentation information in step S5 are shown in FIG. 11A and FIG. 11B.

FIG. 11A shows an example of displayed contents when the overweight detection frequency exceeds a threshold. The displayed contents include no displaying of the remaining life but include displaying of a malfunction rate within a predetermined period (malfunction probability within a half year is 40%) included in a fixed phrase message.

On the other hand, FIG. 11B shows an example of displayed contents of a case where all detection frequencies are less than the threshold. There is no displaying of a malfunction rate within a predetermined period, but the remaining life (3 years) is displayed included in a fixed phrase message. Note that the numerical value of "2 years" in FIG. 11B is a value calculated by device remaining life calculation section 15 independently of the remaining life and the malfunction rate. This value is an average value of remaining lives calculated for each user, for example.

As described above, the present embodiment has a feature of calculating a remaining life of a device based on information relating to malfunctions or problems that have occurred in devices used by a plurality of users respectively (information conventionally not provided for the users) and a usage log of the user, and providing information including the remaining life to the user. Conventionally, it has been impossible to accurately calculate remaining lives of home appliances due to the existence of latent problems unanticipated by a maker in a new model or a new function or when users use home appliances in the way unexpected by the maker. However, according to the present embodiment, it is possible to calculate accurate remaining lives with the above-described feature even if there are latent problems or users use home appliances in the way unexpected by the maker.

Note that the following modifications are possible in present Embodiment 2.

For example, the presentation information may be presented not only on home appliances related to the presentation information but also on other information processing apparatuses (e.g., personal computer, tablet, smartphone) having nothing to do with the presentation information. Alternatively, the presentation information may be presented on the above-described other information processing apparatuses alone.

For example, the malfunction/problem information may be allowed to be collected not only from the same model but also from similar models (e.g., models similar to that of device 20). In that case, the remaining life of the device and the malfunction rate of the device within a predetermined period are calculated based on malfunction/problem information collected from devices of the same model and similar models. Furthermore, the presentation information may be transmitted not only to home appliances of the same model related to the presentation information but also to home appliances of similar models. Alternatively, malfunction/problem information may be collected for or presentation information may be transmitted to only similar devices.

Furthermore, for example, when device 20 is a home appliance other than a washing machine, detection sections 23 may be as shown below. When device 20 is, for example, a refrigerator, a storage amount sensor is applicable as detection section 23. The storage amount sensor is a sensor provided in a refrigeration room, capable of detecting, when illuminance in the refrigeration room is low, that the filling factor in the refrigeration room is high. When device 20 is, for example, a microwave oven, a dirt sensor is applicable as detection section 23. The dirt sensor is a sensor capable of detecting that oil spots, water droplets or the like are adhered to the interior of the refrigerator, the area around the refrigerator, the water supply tank or the like.

When extracting detected contents from a usage log, device remaining life calculation section 15 may not only calculate the total number of detected contents included in the usage log but also assign a predetermined weight to the total number, calculate a score and extract detected contents based on whether or not the score exceeds a threshold. In this way, it is possible to extract detected contents leading to important malfunctions or problems although the number of reports from other users is not large.

Furthermore, for example, the remaining life and the malfunction rate calculated by device remaining life calculation section 15 may be included in the presentation information of Embodiment 1, and then presented to the user.

For example, the remaining life calculated by remaining life calculation section 15 may be made shorter according to the detection frequency of detected contents, degree of importance of the detected contents or the like.

Although Embodiments 1 and 2 of the present invention have been described above in detail with reference to the accompanying drawings, the respective functions of aforementioned server 10 and device 20 can be implemented by a computer program.

FIG. 12 is a diagram illustrating a hardware configuration of a computer that implements the functions of the respective apparatuses using a program. This computer 1000 is provided with input apparatus 1001 such as a keyboard, mouse or touch pad, output apparatus 1002 such as a display or speaker, central processing unit (CPU) 1003, read only memory (ROM) 1004, and random access memory (RAM) 1005. Computer 1000 is also provided with storage apparatus 1006 such as a hard disk apparatus or a solid state drive (SSD), reading apparatus 1007 that reads information from a recording medium such as digital versatile disk read only memory (DVD-ROM) or universal serial bus (USB) memory and network card 1008 that performs communication via a network. The above-described sections are connected via bus 1009.

Reading apparatus 1007 reads a program for implementing the above-described functions of the apparatuses from a recording medium storing the program and causes storage apparatus 1006 to store the program. Alternatively, network card 1008 communicates with a server apparatus connected to a network and causes storage apparatus 1006 to store a program for implementing the above-described functions of the apparatuses.

CPU 1003 then copies the program stored in storage apparatus 1006 to RAM 1005, sequentially reads and executes instructions included in the program from RAM 1005, and thereby implements the above-described functions of the apparatuses.

The techniques described in the foregoing embodiments can also be implemented in the following cloud service types, for example. However, the types in which the techniques described in the foregoing embodiments are implemented are not limited to them.

(Service Type 1: In-House Data Center Type)

Figure 13:
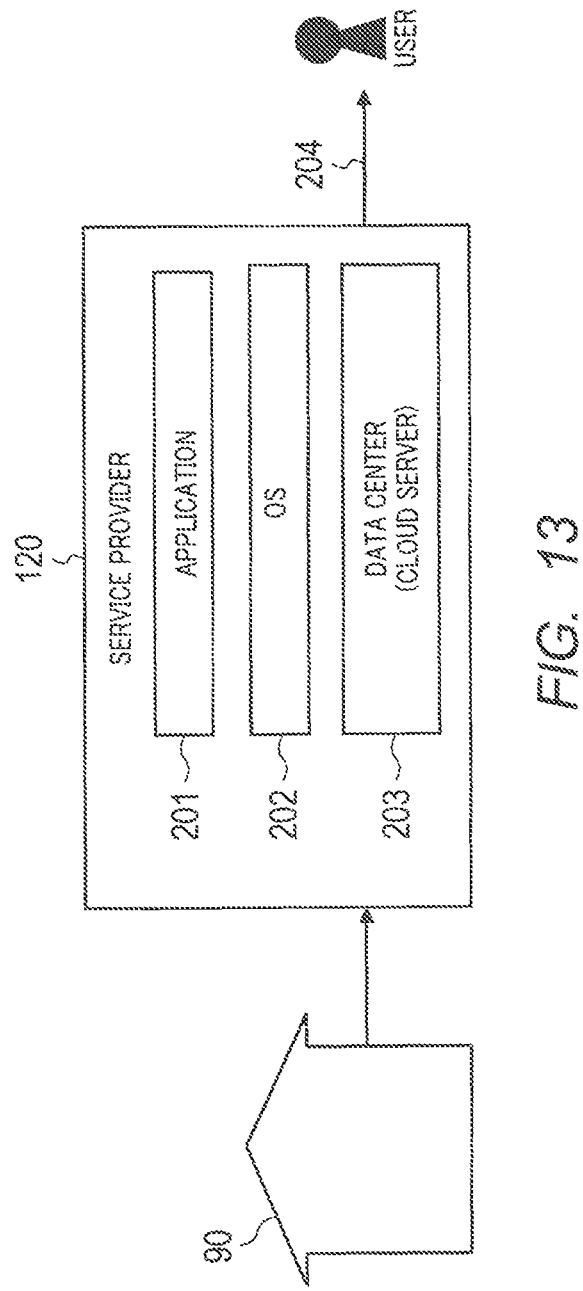
FIG. 13 is a diagram illustrating service type 1 (in-house data center type) according to Embodiments 1 and 2 of the present invention.

FIG. 13 illustrates service type 1 (in-house data center type). This type is a type in which service provider 120 acquires information from group 90 and provides a service to a user. In this type, service provider 120 has a function of a data center operating company. That is, service provider 120 owns cloud server 111 that manages big data. Therefore, no data center operating company exists.

In the present type, service provider 120 operates and manages a data center (cloud server 111) (203). Service provider 120 manages OS (202) and application (201). Service provider 120 provides a service using the OS (202) and the application (201) managed by service provider 120 (204).

(Service Type 2: Type Using IaaS)

Figure 14:
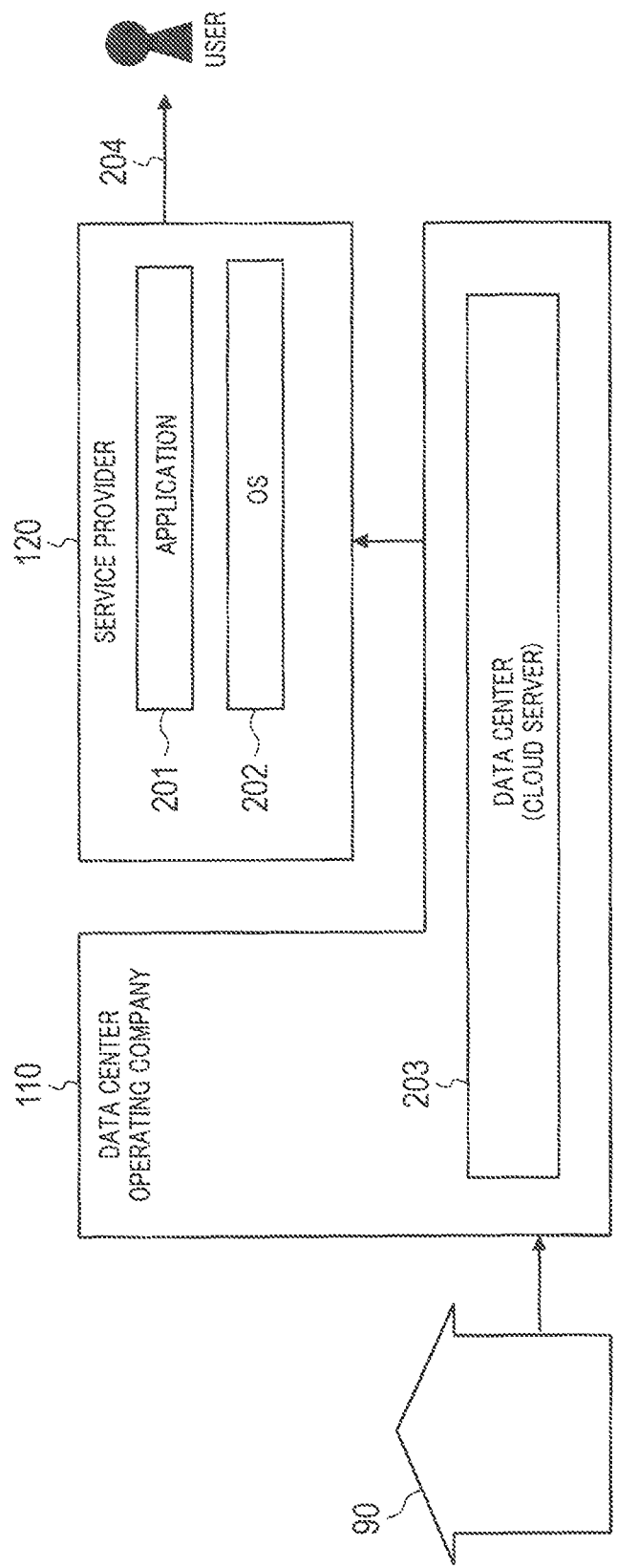
FIG. 14 is a diagram illustrating service type 2 (type using IaaS) according to Embodiments 1 and 2 of the present invention.

FIG. 14 illustrates service type 2 (type using IaaS). Here, IaaS is an abbreviation of infrastructure as a service and is a cloud service providing model that provides an infrastructure itself for constructing and operating a computer system as a service via the Internet.

In the present type, data center operating company 110 operates and manages a data center (cloud server 111) (203). Service provider 120 manages OS (202) and application (201). Service provider 120 provides a service using the OS (202) and the application (201) managed by service provider 120 (204).

(Service Type 3: Type Using PaaS)

Figure 15:
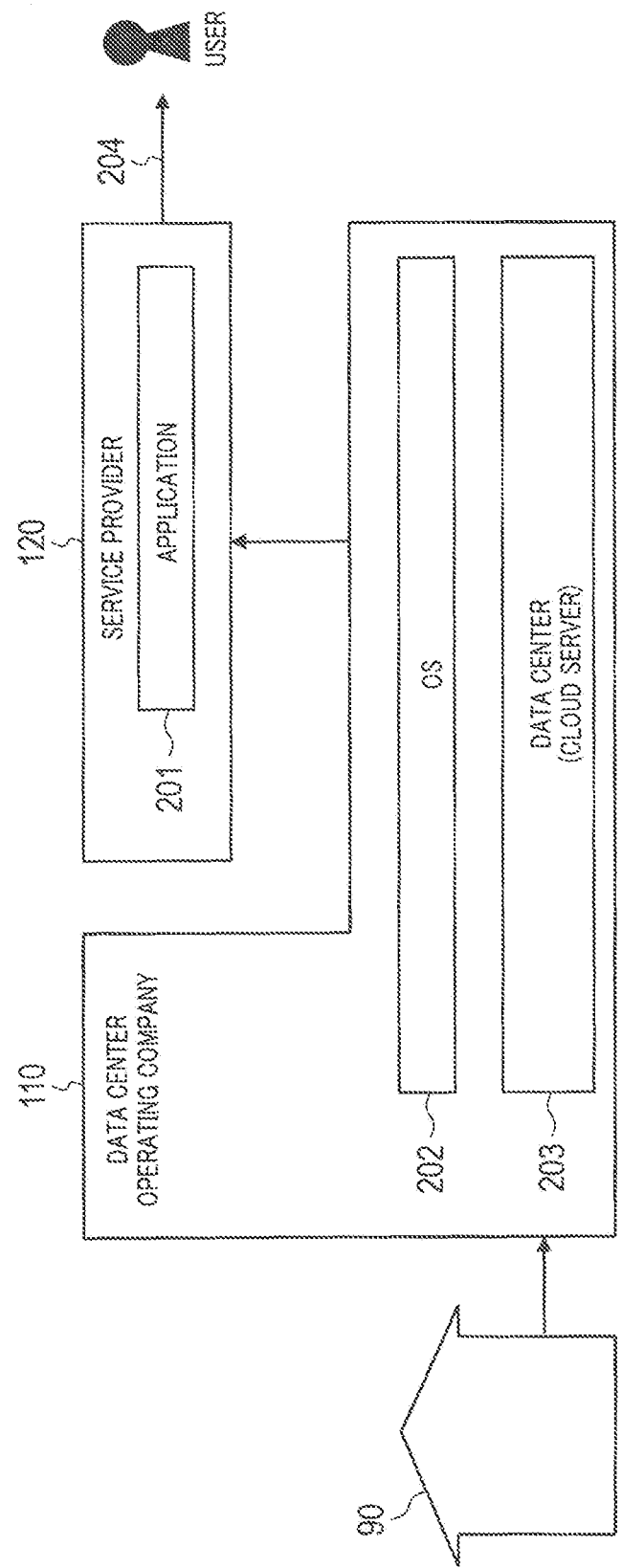
FIG. 15 is a diagram illustrating service type 3 (type using PaaS) according to Embodiments 1 and 2 of the present invention.

FIG. 15 illustrates service type 3 (type using PaaS). Here, PaaS is an abbreviation of a platform as a service and is a cloud service providing model that provides a platform that serves as a basis for constructing and operating software as a service via the Internet.

In the present type, data center operating company 110 manages OS (202) and operates and manages a data center (cloud server 111) (203). Furthermore, service provider 120 manages application (201). Service provider 120 provides a service using the OS (202) managed by data center operating company 110 and the application (201) managed by service provider 120 (204).

(Service Type 4: Type Using SaaS)

Figure 16:
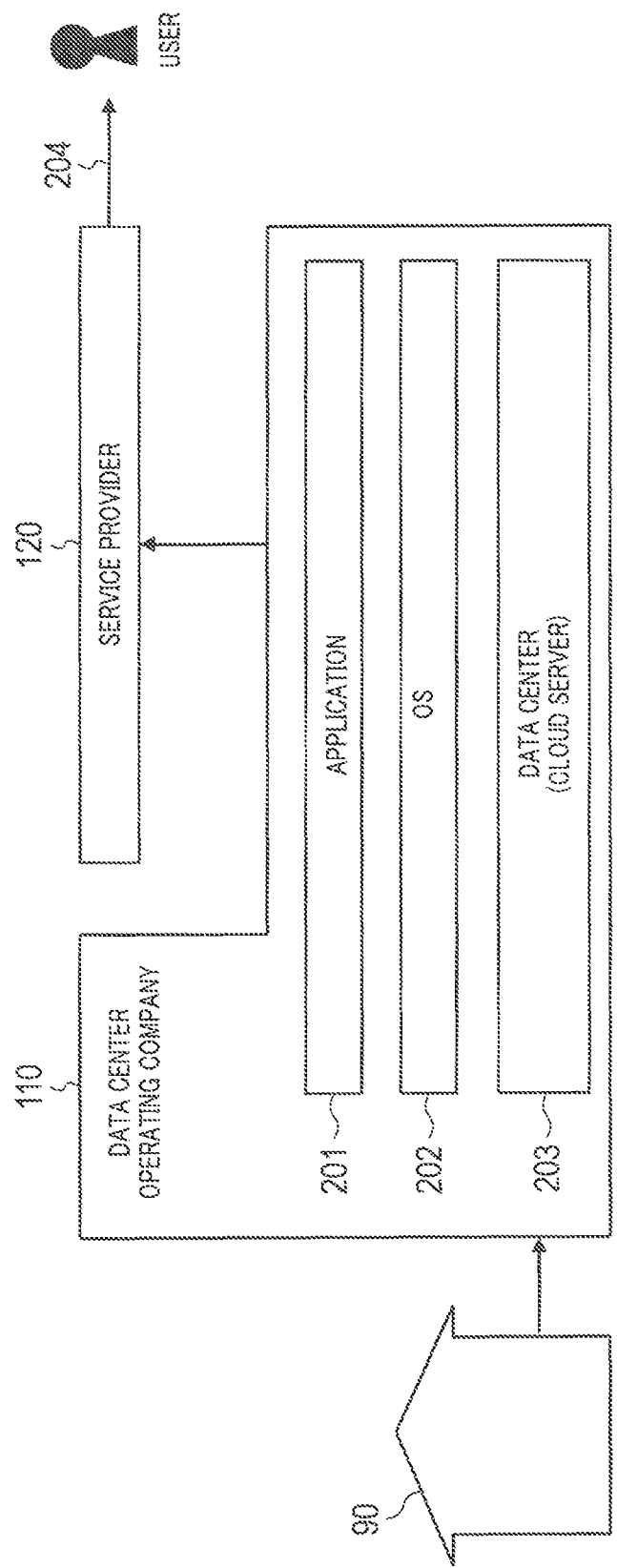
FIG. 16 is a diagram illustrating service type 4 (type using SaaS) according to Embodiments 1 and 2 of the present invention.

FIG. 16 illustrates service type 4 (type using SaaS). Here, SaaS is an abbreviation of software as a service. For example, SaaS is a cloud service providing model having a function that allows, for example, a company or individual (user) who does not own any data center (cloud server 111) to use application 201 provided by a platform provider who owns the data center (cloud server 111) via a network such as the Internet.

In the present type, data center operating company 110 manages the application (201), manages OS (202), and operates and manages a data center (cloud server 111) (203). Service provider 120 provides a service using the OS (202) and the application (201) managed by data center operating company 110 (204).

In all the above-described types, suppose that service provider 120 performs action of providing a service. For example, service provider 120 or data center operating company 110 may develop OS 202, application 201 or a database of big data on its own or outsource such development to a third party.

The present invention is not limited to the description of the above-described embodiments and can be modified without departing from the spirit and scope of the present invention.

The disclosure of Japanese Patent Application No. 2013-177694 filed on Aug. 29, 2013, including the specification, drawings and abstract is incorporated herein by reference in its entirety.

INDUSTRIAL APPLICABILITY

The present invention is suitable for use in a technique of providing information relating to home appliances to users (e.g., apparatus, system, method, and program or the like).

REFERENCE SIGNS LIST 1, 2 User
10 Server
11 Malfunction/problem information collection section
12 Presentation information generation section
13 Presentation information transmitting section
14 Usage log collection section
15 Device remaining life calculation section
20 Device
21 Presentation information receiving section
22 Presentation section
23 Detection section
24 Usage log transmitting section
90 Group
91 Device
92 Home gateway
100 Information providing system
110 Data center operating company
111 Cloud server
120 Service provider
121 Server
201 Application
202 OS
203 Data center
204 Service provision
301 User ID
302 Model ID
303 Malfunction/problem state
304 Detected contents
305 Operating time
701 Date and time
702 Detected contents
1000 Computer
1001 Input apparatus
1002 Output apparatus
1003 CPU
1004 ROM
1005 RAM
1006 Storage apparatus
1007 Reading apparatus
1008 Network card
1009 Bus

The invention claimed is:

1. A method to be performed by a server computer connected on a network via a network connection for presenting a malfunction probability of a target appliance to an apparatus on the network, the method comprising:
    (A) storing, into a database connected on the network and using a usage log collection section, logs of appliances that include (i) time information including times elapsed after starting to use the respective appliances, (ii) detection information indicating events that have been detected by sensors disposed in the respective appliances and that possibly cause malfunctions of the respective appliances at different operating times, and (iii) malfunction information indicating whether malfunctions have actually occurred in the respective appliances at the different operating times;
    (B) retrieving, from the database and using a malfunction information collection section, events same as or similar to a target event that has been detected at the target appliance, the retrieved events having been detected at a first group of appliances of which models each are same as or similar to that of the target appliance at the different operating times;
    (C) calculating using a remaining life calculation section a malfunction rate in each elapsed times after starting of use on basis of the logs of the first group of appliances, the malfunction rate being a rate of a number of occurrence of the malfunctions to a number of the retrieved events among the first group of appliances,
    (D) generating using a presentation information generation section the malfunction probability of the target appliance at a future time on basis of the calculated malfunction rate and a time elapsed after starting to use the target appliance; and
    (E) transmitting, to the apparatus over the network, the malfunction probability to cause a display included in the apparatus to present the malfunction probability at the future time, wherein
    in the (D), malfunction probabilities of the target appliance at respective future times are generated; and
    in the (E), the malfunction probabilities of the target appliance at the respective future times are presented on the display.

2. The method according to claim 1, further comprising:
    (F) calculating a life time of the target appliance on basis of the logs of the first group of appliances,
    wherein the future time is before end point of the life time.

3. The method according to claim 1, further comprising:
    before the (B),
    (G) receiving a target log of the target appliance;
    (H) counting, from the received target log, a number of events by type; and
    (I) specifying, as the target event, the events of which the number is equal to or greater than a threshold.

4. The method according to claim 1, wherein
the time information further includes a detection time at which each of the events has been detected.

5. The method according to claim 1, wherein
the target appliance is a washing machine, a refrigerator, an air-conditioner or an oven.

6. The method according to claim 1, wherein
the sensors include at least one selected from the group consisting of a water quality sensor, a weight sensor, a button sensor, a storage amount sensor, and a dirt sensor.

7. The method according to claim 1, wherein
the target appliance is a washing machine;
the sensors include at least one selected from the group consisting of a water quality sensor, a weight sensor, a button sensor; and
the target event is at least one selected from the group consisting of turbidity of water in laundry sink of the washing machine, overweight in the laundry sink, and rotation stopping operation during rotation of the laundry sink.

* * * * *